(12) United States Patent
Noureddini

(10) Patent No.: US 6,174,501 B1
(45) Date of Patent: Jan. 16, 2001

(54) SYSTEM AND PROCESS FOR PRODUCING BIODIESEL FUEL WITH REDUCED VISCOSITY AND A CLOUD POINT BELOW THIRTY-TWO (32) DEGREES FAHRENHEIT

(75) Inventor: Hossein Noureddini, Lincoln, NE (US)

(73) Assignee: The Board of Regents of the University of Nebraska, Lincoln, NE (US)

( * ) Notice: Under 35 U.S.C. 154(b), the term of this patent shall be extended for 0 days.

(21) Appl. No.: 09/271,793

(22) Filed: Mar. 18, 1999

Related U.S. Application Data

(63) Continuation-in-part of application No. 08/961,939, filed on Oct. 31, 1997, now Pat. No. 6,015,440.

(51) Int. Cl.$^7$ .............................. B01J 8/00; B01J 10/00
(52) U.S. Cl. ............................................ 422/189; 422/188
(58) Field of Search ..................... 422/188, 198, 422/201–205, 215, 224

(56) References Cited

U.S. PATENT DOCUMENTS

| | | | |
|---|---|---|---|
| 3,168,385 | 2/1965 | Giammaria . | |
| 4,309,438 | * 1/1982 | Christensen et al. | 514/339 |
| 4,906,361 | * 3/1990 | Arnaud | 200/189 |
| 5,145,563 | 9/1992 | Culbreth, III et al. | 203/64 |
| 5,160,506 | 11/1992 | Schor et al. | 44/308 |
| 5,227,817 | * 7/1993 | Martyak et al. | 210/634 |
| 5,286,606 | * 2/1994 | Rahman et al. | 430/311 |
| 5,308,365 | 5/1994 | Kesling, Jr. et al. | 44/447 |
| 5,334,621 | * 8/1994 | Beshouri | 521/64 |
| 5,413,634 | 5/1995 | Shawl et al. | 106/696 |
| 5,426,207 | * 6/1995 | Harrison et al. | 556/274 |
| 5,476,971 | 12/1995 | Gupta | 568/619 |
| 5,514,820 | * 5/1996 | Assmann et al. | 554/167 |
| 5,520,708 | 5/1996 | Johnson et al. | 44/388 |
| 5,578,090 | 11/1996 | Bradin | 44/308 |
| 5,767,257 | * 6/1998 | Schafermeyer et al. | 536/18.6 |

OTHER PUBLICATIONS

"Methyl and Ethyl Soybean Esters As Renewable Fuels For Diesel Engines", JAOCS, vol. 61, No. 10 Oct. 1984.

"Diesel Fuel Derived from Vegetable Oils, III. Emissin Tests Using Methyl Esters Of Used Frying Oil", by Mittelbach et al., JAOCS, vol. 65, No. 7, 1988.

"Low–Temperature Properties Of Triglyceride–Based Diesel Fuels: Transesterified Methyl Esters and Petroleum Middle Distillate/Ester Blends", by Dunn et al, JAOCS, vol. 72, No. 8, 1995.

"Reducing The Crystallization Temperature Of Biodiesel By Winterizing Methyl Soyate", by Lee et al., JAOCS, vol. 73, No. 5, 1996.

"Vegetable Oils: From Table To Gas Tank", by Chowdhury et al., Chem. Eng. Feb. 1993.

(List continued on next page.)

\* cited by examiner

*Primary Examiner*—Shrive Beck
*Assistant Examiner*—Alexa A. Doroshenk
(74) *Attorney, Agent, or Firm*—James D. Welch

(57) ABSTRACT

Triglycerides are reacted in a liquid phase reaction with a homogeneous basic catalyst and alcohol, such as ethanol or methanol. The reaction yields a spatially separated two phase result with an upper located non-polar phase consisting principally of transesterified triglycerides and a lower located phase consisting principally of crude glycerol and residual transesterified triglycerides. The transesterified triglycerides and/or glycerol phase is/are optionally, each separately passed through strong cationic ion exchanger(s) to remove anions, resulting in neutral product(s). The crude glycerol is then flashed to remove alcohol and is reacted with an etherifying agent, such as isobutylene or isoamylene, in the presence of a strong acid catalyst to produce glycerol ethers. The glycerol ethers are then added back to the transesterified triglycerides to provide an improved biodiesel fuel.

27 Claims, 4 Drawing Sheets

OTHER PUBLICATIONS

"A Low Waste Process For The Production Of Biodiesel", Ahn et al., Sep. Sci. & Tech., 30(7–9) 1995.

"Technical Uses Of Fatty Acid Esters", by Meffert, JAOCS, vol. 61, No. 2, Feb. 1984.

"Biodiesel: An Updated Report", by Pearl, Render, Jun. 1996.

"Transesterification Kinetics Of Soybean Oil", Friedman et al., JAOCS, vol. 63, No. 10, (Oct. 1986).

"Production Of Ethers Of Glycerol From Crude Glycerol—The Byproduct Of Biodiesel Production", Noureddini et al., Advances in Environmental Research, 2 (2), (1998); and.

"A Continuous Process For The Conversion Of Vegetable Oils Into Methyl Esters Of Fatty Acids", Noureddini et al., JAOCS, vol. 75, No. 1, (1998).

"Ethanol", Wyman, App. Biochem. & Biotech., vol. 24/25, (1990),.

"Ethanol Production From Agricultural Biomass Substrates", Bothast et al., Advances in Applied Microbiology, vol. 44, (1997).

Also disclosed is a handbook titled "Biomass Handbook", Kitani & Hall, published by Gordon and Breach, (1989).

US 6,174,501 B1

SYSTEM AND PROCESS FOR PRODUCING BIODIESEL FUEL WITH REDUCED VISCOSITY AND A CLOUD POINT BELOW THIRTY-TWO (32) DEGREES FAHRENHEIT

This Application is a CIP of Allowed U.S. patent application Ser. No. 08/961,939 filed Oct. 31, 1997, now U.S. Pat. No. 6,015,440.

TECHNICAL FIELD

The present invention is related to oxygenated fuels, and more particularly to an oxygenated biodiesel fuel with a cloud-point below 32 degrees Fahrenheit, and systems and processes for producing said oxygenated biodiesel fuel with a cloud-point below 32 degrees Fahrenheit, said oxygenated biodiesel fuel consisting of a mixture of transesterified triglycerides and a cloud-point reducing amount of etherified glycerol, which crude glycerol is produced as a by-product of a triglyceride transesterification process.

BACKGROUND

Since the introduction of biodiesel fuel in South Africa prior to World War II, work has proceeded to increase its viability as a fuel substitute. In more recent years, environmental and economic pressures, (eg. events such as Oil Embargoes, and laws such as the Clean Air Act of 1990), have provided impetus for continued development. Goals include production of biodiesel with cleaner burning properties and improved cold-temperature flow characteristics, however, most effort to date has been focused on waste minimization, by-product separation technology, and/or by-product utilization. The reason for this is best demonstrated by noting that production of Biodiesel fuel by a methyl-esterification process as applied to soy oil, produces an effluent stream with twenty (20%) percent crude glycerol content, which crude glycerol content must typically be disposed of. In view thereof, it can be readily appreciated that a method which would reduce disposal requirements while improving biodiesel fuel burning and cold-temperature flow properties, would be of value.

It is noted that Biodiesel fuel has been reported by Clark et al., in an article titled "Methyl and Ethyl Soybean Esters As Renewable Fuels For Diesel Engines", JAOCS, Vol. 61, No. Oct. 10, 1984, to produce $NO_x$ emissions higher than produced by petroleum based Diesel fuel. Additional related discussion is found in an article titled "Diesel Fuel Derived From Vegetable Oils, III. Emission Tests Using Methyl Esters Of Used Frying Oil", by Mittelbach et al., JAOCS, Vol. 65, No. Jul. 7, 1988.

It is also noted that the use of biodiesel fuel, (i.e. conventionally methyl esters of triglycerides), is limited in practice as it demonstrates a "Cloud Point" of near zero (0.0) degrees centigrade, (i.e. thirty-two (32) degrees Fahrenheit), while the Cloud point of Diesel #2 is near negative sixteen (−16) degrees centigrade. A similar disparity exists with respect to the "Pour Point", which for Biodiesel fuels is near negative two (−2) degrees centigrade, while that for Diesel fuel is near negative twenty-seven (−27) degrees centigrade. This is discussed in an article titled "Low-Temperature Properties Of Triglyceride-Based Diesel Fuels: Transesterified Methyl Esters and Petroleum Middle Distillate/Ester Blends", by Dunn et al, JAOCS, Vol. 72, No. 8, 1995. These adverse cold temperature flow properties of Biodiesel fuel as compared to Diesel fuel, with accompanying reduced viscosity and low temperature flow lead to problems such as truck fuel filter plugging below thirty-two (32) degrees Fahrenheit. The use of Biodiesel fuels can not become widespread unless this problem is overcome. Suggested solutions include Methyl Ester "winterization", which is discussed in an article titled "Reducing The Crystallization Temperature Of Biodiesel By Winterizing Methyl Soyate", by Lee et al., JAOCS, Vol. 73, No. 5, 1996; and application of biotechnology to produce biodiesel with improved specifications, as discussed in an article titled "Vegetable Oils: From Table To Gas Tank", by Chowdhury et al., Chem. Eng. February 1993. Such avenues of investigation might prove successful but as yet are of questionable industrial value.

As mentioned, transesterification of soy oil to form Biodiesel produces approximately twenty (20%) crude glycerol as a by-product, and while uses for crude glycerol have been pursued, mostly in Europe, costly purification steps must typically be performed to produce even a low grade product of questionable value. Uses for said low grade product include mixing with animal manure to form a fertilizer, and mixing with feed for animals. This is discussed in an article titled "A Low Waste Process For The Production Of Biodiesel", Ahn et al., Sep. Sci. & Tech., 30(7–9) 1995. Research has shown that potential exists for use of bacteriologically transformed crude glycerol to form products useful in plastics production, ("Vegetable Oils: From Table To Gas Tank", by Chowdhury et al., Chem. Eng. February 1993). The most promising and economically viable use for crude glycerol might be, however, conversion into mono and di-fatty acid esters of crude glycerol. This is discussed in an article titled "Technical Uses Of Fatty Acid Esters", by Meffert, JAOCS, Vol. 61, No. 2, February 1984. This alternative might prove to be most beneficial in the economics of Biodiesel fuel production. To understand why this is the case, it must be understood that crude glycerol produced as a by-product in production of Biodiesel fuel via transesterification of triglycerides is inherently insoluble in the Biodiesel Fuel.

Another article which describes transesterification is titled "Transesterification Kinetics Of Soybean Oil", Friedman et al., JAOCS, Vol. 63, No. 10, (October 1986).

Papers authored by the Inventor, which are predated by the filing date of the parent Application hereto, are "Production Of Ethers Of Glycerol From Crude Glycerol—The Byproduct Of Biodiesel Production", Noureddini et al., Advances in Environmental Research, 2 (2), (1998); and "A Continuous Process For The Conversion Of Vegetable Oils Into Methyl Esters Of Fatty Acids", Noureddini et al., JAOCS, Vol. 75, No. 1, (1998). Said papers are incorporated herewithin by reference.

As the present invention can be practiced utilizing any alcohol in the fatty acid esterification process, (including renewable source ethanol), two additional papers are cited herein. The first is "Ethanol", Wyman, App. Biochem. & Biotech., Vol 24/25, (1990), and the second is "Ethanol Production From Agricultural Biomass Substrates", Bothast et al., Advances in Applied Microbiology, Vol. 44, (1997).

Also disclosed is a handbook titled "Biomass Handbook", Kitani & Hall, published by Gordon and Breach, (1989).

Patents of which the inventor is aware are:
U.S. Pat. No. 5,308,365 to Kesling Jr. et al.;
U.S. Pat. No. 5,578,090 to Bradin;
U.S. Pat. No. 5,520,708 to Johnson et al.;
U.S. Pat. No. 5,476,971 to Gupta;
U.S. Pat. No. 5,413,634 to Shawl et al.;
U.S. Pat. No. 5,160,506 to Schur et al.;

U.S. Pat. No. 3,168,385 to Giammaria et al.; and

U.S. Pat. No. 5,145,563 to Culbreth III et al.

The 708 Patent to Johnson et al. describes reaction of triglycerides with methanol in the presence of base to produce fatty acid methyl esters, and then describes a specific treatment to reduce "Cloud-Point". However, no mention of the use of ethers of glycerol as an agent to reduce "Cloud-Point" is found therein. The 971 Patent to Gupta describes reacting pure glycerol with isobutylene in the presence of an acid catalyst in a two phase reaction to produce mono-, di- and tri-tertiary butyl ethers of glycerol. The 090 Patent to Bradin describes to reduce fatty acid methyl ester content, and the 365 Patent to Kesling describes the use of Glycerol ethers mixed with Biodiesel fuels to improve emissions content, although no indication of improved Cloud-point or viscosity properties were noted. Said 365 Patent describes reduction of particulate, hydrocarbon, carbon monoxide and unregulated aldehyde content in tests on diesel fuel in which ethers of glycerol were present. The use of ethers of glycerol as extractive distillation agent is described in the 563 Patent to Culbreth III et al., and the 634 Patent to Shawl et al. describes use of ethers of glycerol as an additive to enhance physical properties of cement. The 506 Patent to Schur et al. describes a fuel for use in two stroke engines and comprises oils or ester oils. The 385 Patent to Giammaria et al. describes an anti-knock "appreciator" which combines ethers and alkyl esters.

Alkyl ethers of glycerol have been explored for decades, with references existing back to the 1930's. In addition, it is noted that use of ether derivatives in gasoline reformulation to form oxygenated gasoline, (eg. MTBE & ETBE), is well known. In fact, it is estimated that two-hundred-sixty-thousand (260,000) barrels of Methyl Tertiary Butyl Ether (MTBE) and Ethyl Butyl Tertiary Esters (ETBE) are utilized each day to this end. This is discussed in an article titled: "Biodiesel: An Updated Report", by Pearl, Render, June 1996.

The rise of (MTBE) production, has produced materials and methods which allow their glycerol based counterpart, (glycerol tertiary butyl ether (GTBE)), to be made easily using an acidic ion exchange resin such as Amberlyst-15. Use of said resin enables high conversion of glycerol and isobutylene into mono-, di-, and tri- (tertiary) butyl ethers of glycerol. The reaction is more easily taken to high conversions, (no simultaneous distillation as with (MTBE) production), because of the multifunctionality of glycerol and hence stepwise products.

It is noted that known large scale processes for production of Biodiesel fuel largely downplay the significance of the economic loss caused by by-product crude glycerol production, and consider the resulting crude glycerol volume, (which again constitutes approximately twenty (20%) percent of the source triglyceride volume), as something which can be simply discarded, or sold for whatever the market will pay. As costly purification of said crude glycerol is typically necessary to prepare it for third party usage, the price the market will pay is typically minimal. It should then be understood that a process for producing Biodiesel fuel which not only conveniently reclaims said by-product glycerol, but advantageously reclaims it into produced Biodiesel fuel in a way that improves the Biodiesel fuel, would have utility. It is further noted that present invention produced Biodiesel, including glycerol ethers, can be utilized in production of Diesel fuel to produce reformulated Diesel fuel which includes, typically, twenty (20%) percent or more Biodiesel fuel.

With the exception of the Patent which will issue on the Parent Application of which this Application is a Continuation-In-Part, no known prior art reference, alone or in combination with other references, describes, or fairly suggests a process including the use of the product of etherification of crude glycerol produced as a by-product of Biodiesel fuel production, (which Biodiesel fuel is produced by the esterification of renewable triglycerides), as an additive back to said Biodiesel fuel to reduce the Cloud-point, viscosity and pour-point thereof, and to provide cost per volume reducing, maximum Biodiesel fuel volume production, from a given volume of source triglycerides. In addition it is noted that previous methods known to the inventor, for producing methyl esters and glycerol ethers, have been mutually exclusive with respect to production of Biodiesel fuel with a reduced cloud-point.

It should be apparent that even in view of known prior art, there remains a need for systems and procedures which enable the use of crude glycerol, (produced as a by-product of an esterification of renewable triglycerides procedure), as a pour-point, viscosity and Cloud-point temperature reducing, volume maximizing and cost per volume reducing additive to produced transesterified triglycerides (i.e. Biodiesel fuel). Such a procedure would provide economic and operational benefits, and provide a product with properties more closely resembling those of petroleum based Diesel fuel.

DISCLOSURE OF THE INVENTION

It is known that subjecting source triglycerides, (soy oil for instance), to known methyl-esterification processes results in an effluent stream of "Biodiesel fuel" consisting of approximately eighty (80%) Esterified Triglycerides, accompanied by twenty (20%) Crude Glycerol. As mentioned in the Background Section of this Disclosure, said crude glycerol is inherently insoluble in said produced esterified triglycerides. However, if subjected to an etherification process, said crude glycerol forms a product which is soluble with said esterified triglycerides, thereby, by a mixing process, enabling conversion of essentially an entire volume of source triglycerides to a volume of usable present invention "Biodiesel fuel". (It is of benefit to note at this point that conventionally the terminology "Biodiesel Fuel" has been used to identify "Esterified Triglycerides" per se. Present invention "Biodiesel Fuel" however, is distinguished therefrom in that it consists of a mixture of Transesterified Triglycerides and Etherified Glycerol).

Continuing, the insolubility of Crude Glycerol in Esterified Triglyceride Biodiesel fuel, (which crude glycerol and esterified triglycerides are both produced by a transesterification process applied to triglycerides), enables relatively easy separation of a majority of said Esterified Triglyceride "Biodiesel fuel" therefrom, although in a practical sense, some small percentage of said esterified triglyceride Biodiesel fuel and esterifying agents will accompany crude glycerol in any separation process.

The present invention recognizes the above facts, and in view thereof teaches a procedure by which Cloud-point, viscosity and pour-point improving ethers of glycerol, (which are soluble in Biodiesel fuel), can be produced from by-products of Biodiesel fuel producing esterification of source triglycerides. The present invention also recognizes the beneficial effects on emission content of oxygenating Biodiesel fuel, and provides for preferred production of doubly oxygenated ethers of glycerol. However, it is emphasized that the major benefit of providing ethers of glycerol to esterified triglycerides to produce a present invention "Biodiesel fuel" is the dramatic, previously unreported, effect such is observed to have on the temperature dependence of Cloud-point, viscosity and pour-point of the resulting reformulated, present invention "Biodiesel fuel".

Continuing then, the method of the present invention starts with the providing of a quantity of triglycerides, from vegetable oil and/or animal fat source(s). Then, by a transesterification process, providing a mixture of transesterified triglycerides, (conventionally termed Biodiesel fuel), and crude glycerol. Said transesterified triglycerides are an ester of fatty acids with a Chemical Formula:

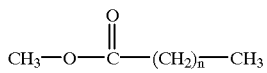

and said Glycerol has the Chemical Formula:

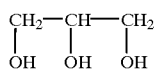

It is noted that the transesterified triglycerides, (i.e. conventional Biodiesel fuel), produced has an undesirably high Cloud Point of more than thirty-two (32) Fahrenheit Degrees.

The present invention then teaches separating the crude glycerol from the transesterified triglycerides by a process which provides approximately eighty (80%) percent of the total volume in a relatively pure transesterified triglyceride form. The remaining twenty (20%) percent of the total volume produced contains some transesterified triglycerides in mixture with the produced crude glycerol. It is further noted that approximately eighty-five (85%) percent of the original triglycerides have become separated "Pure" (Biodiesel fuel), via the process described to this point, and that approximately fifteen (15%) percent of original triglycerides remain mixed with the produced crude glycerol.

Next, the present invention teaches that the mixture of crude glycerol and accompanying transesterified triglycerides be subjected to an etherification process which serves to produce a mixture of ethers of glycerol and transesterified triglycerides.

This step can be optionally followed by separating out unwanted ethers of glycerol which have two hydroxyl (OH) groups present, leaving only high oxygen content ethers of glycerol which have only one, or no, such hydroxyl (OH) group, such as Di and Tri-Ethers:

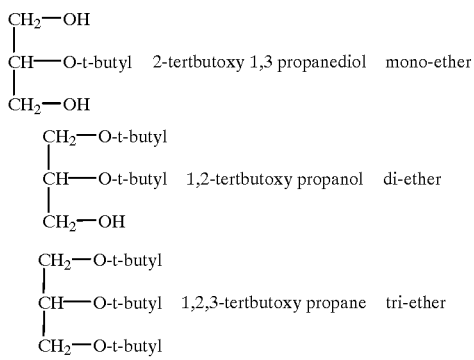

(The present invention has investigated the effect of adding the indicated ethers of glycerol to Biodiesel fuel and found that di- and tri-ethers provide better Biodiesel fuel improving results.)

Next, and what is known to be Patentable by the Allowance of patent application Ser. No. 08/961,939, is that at least some of the mixture of the ethers of glycerol with some transesterified triglycerides present are recombined with the "Pure" transesterifed triglycerides to form a present invention "Oxygenated" Biodiesel fuel with a Cloud-point reduced to below 32 degrees Fahrenheit, (for instance, approximately twenty (20) degrees Fahrenheit), where no other cloud-point reducing agents are required or added, and where no other etherified glycerol from a source other than the byproduct production of glycerol resulting from the transesterification of triglycerides are required or added. Note that this procedure can reclaim all transesterified triglycerides that were not separated out initially, but rather went along with the crude glycerol, and because of the etherification of the crude glycerol, beneficially provides oxygenated ethers of glycerol to the transesterified triglycerides. The end result is a volume "maximized" present invention Biodiesel fuel consisting of a mixture of transesterified triglycerides and etherified glycerol, which present invention "Biodiesel fuel", presents with a reduced Cloud-point, and with lower viscosity as compared to transesterified triglycerides per se.

The present invention also provides that some of the crude glycerol, or glycerol ethers, produced can be diverted and utilized for other purposes should all thereof not be required to improve the Cloud-point, pour-point and viscosity properties of the present invention Biodiesel fuel produced.

A method of the present invention can then be described as a process of producing an oxygenated Biodiesel fuel with a cloud point below 32 degrees Fahrenheit, beginning with the step of providing a quantity of triglycerides followed by performing transesterification of at least some of said triglycerides to produce a mixture of Transesterified triglycerides and crude glycerol. This is followed by separating out, in an essentially pure state, most of said Transesterified triglycerides from said mixture of Biodiesel fuel and crude glycerol, leaving a mixture of crude glycerol with some amount of said Transesterified triglycerides. This is followed by performing etherification of the crude glycerol in said mixture of crude glycerol with some amount of said Transesterified triglycerides remaining therein. Finally the resulting mixture of glycerol ethers with some amount of Transesterified triglycerides remaining therein is remixed with the essentially pure state, Transesterified triglycerides, such that an oxygenated Biodiesel fuel comprising a mixture of esters of triglycerides and ethers of glycerol is produced which has a cloud point below 32 degrees Fahrenheit. Said method can further comprise the steps of separating out unwanted glycerol and double hydroxyl group containing ethers of glycerol, leaving ethers of glycerol with no more than one hydroxyl group present, prior to remixing resulting mixture of glycerol ethers with essentially pure state Transesterified triglycerides. As alluded to, said method can involve diverting some of the separated out crude glycerol produced by the transesterification of said triglycerides, prior to performing the etherification of remaining crude glycerol.

The present invention also includes an oxygenated Biodiesel fuel product with a cloud-point below 32 degrees Fahrenheit, said oxygenated Biodiesel fuel consisting of a mixture of transesterified triglycerides and a cloud-point reducing amount of etherified glycerol, said product being produced by the process comprising the steps of:

a. providing a quantity of triglycerides;
b. transesterifying at least a portion of said triglycerides by mixing with a base and alcohol to produce a mixture of transesterified triglycerides and crude glycerol;

c. separating out, in an essentially pure state, most of said transesterified triglycerides from said mixture of transesterified triglycerides and crude glycerol, thereby also providing separated-out substantially crude glycerol;

d. optionally diverting a portion of said separated-out substantially crude glycerol;

e. etherifying remaining crude glycerol provided by steps c. and optionally d.; and f. remixing at least a portion of the resulting glycerol ethers produced in step e., with at least a portion of the step c. separated-out, essentially pure state transesterified triglycerides.

Said steps a.–f. serve to produce said oxygenated biodiesel fuel with a cloud-point below 32 degrees Fahrenheit, without the required addition of other cloud-point reducing additive(s) and/or glycerol ethers from a source other than that identified in step e.

Said process of producing an oxygenated biodiesel fuel with a cloud-point below 32 degrees Fahrenheit can further comprise a selection from the group consisting of:

g. use of alcohol and a base catalyst in the step a. transesterification of triglycerides;

h. in step e., utilization of isobutylene or isoamalene as the etherifying agent to etherify said crude glycerol;

i. in step e., utilization of sufficient isobutylene or isoamalene as the etherify agent to etherify said crude glycerol, so that production of higher di and tri-ethers as opposed to mono-ethers is favored;

j. after step e. and before step f., by treating said etherified glycerol with water, separating out unwanted double hydroxyl group containing ethers of glycerol produced in step e., prior to remixing at least a portion of the resulting glycerol ethers and at least a portion of said essentially pure state transesterified triglycerides separated-out in step c.

It is to be understood that the transesterification of triglycerides can be accomplished with other alcohols and basic catalyst and that use of any esterifying agent should be considered within the scope of the present invention.

It is to be understood that etherification of crude glycerol can be accomplished with other than isobutylene, (e.g. isoamylene), and that use of any glycerol etherification agent should be considered within the scope of the present invention.

The present invention also comprises:

a. oxygenated Biodiesel fuel with a cloud point below 32 degrees Fahrenheit comprising esterified triglycerides in mixture with ethers of crude glycerol, which crude glycerol is the by-product of a process which provides said esters of triglycerides beginning with triglycerides from at least one source selected from the group consisting of: (plant and animal), said oxygenated Biodiesel fuel being at least predominately esterified triglycerides by volume, where said oxygenated biodiesel fuel with a cloud-point below 32 degrees Fahrenheit does not include or require addition of other cloud-point reducing additive(s) and/or glycerol ethers obtained from a source other than that produced by esterification of triglycerides; and b. systems for practicing the process of arriving at present invention "Biodiesel fuel" are typically comprised of functional combinations of elements selected from a group including:
  a transesterification unit;
  a transesterified triglycerides/crude glycerol separator unit;
  deionization units;
  a flash unit for separating glycerol and alcohol;
  a reaction unit for etherifying crude glycerol;
  a second flash unit for separating glycerol etherifying agent and etherified glycerol;
  an extraction unit;
  a distillation unit;
  "xTBE" separation units, ("MTBE" "ETBE" etc.);
  functional interconnections;

which elements, and their interconnections, will be better understood by referring to the Detailed Description Section of this Disclosure.

It is also to be understood that a present invention system for practicing a process of producing an oxygenated biodiesel fuel with a cloud-point below 32 degrees Fahrenheit, said oxygenated biodiesel fuel consisting of a mixture of transesterified triglycerides and a cloud-point reducing amount of etherified glycerol, can comprise a transesterification unit which is a heat exchanger/reactor unit comprised of feed tube(s) which have an internal volume and outer surface. During use, a quantity of triglycerides and base catalyst and alcohol can be caused to flow through the internal volume of said feed tube(s). Said heat exchange/reactor further includes means for causing steam or heating fluid to flow around the outer surface of said feed tube(s) in use so as to control the temperature of said triglycerides and base catalyst and alcohol during passage through the internal volume of said feed tube(s) to the end that transesterification of at least some of said triglycerides is achieved. Preferred present invention practice provides that at least some of the triglyceride transesterification heat exchange/reactor feed tube(s) have, in the internal volume thereof, a static mixer which remains statically in place as a quantity of triglycerides and base catalyst and methyl alcohol is, during use, caused to flow through said internal volume thereof, to the end that said quantity of triglycerides and base and alcohol are continuously mixed together by interaction therewith.

The present invention further can include the application of deionization units in the production of oxygenated biodiesel fuel with a cloud-point below 32 degrees Fahrenheit which consists of a mixture of transesterified triglycerides and a cloud-point reducing amount of etherified glycerol, said esters of triglycerides being produced by transesterification of triglycerides provided from at least one source selected from the group consisting of:
  plant and animal,
said oxygenated biodiesel fuel being produced by a procedure which comprises the step of passing at least said transesterified triglycerides through a strong cationic ion exchanger to remove anions, resulting in substantially de-ionized transesterified triglycerides. As well, crude glycerol or glycerol ethers can be similarly de-ionized by passage through another strong cationic ion exchanger.

The present invention will be better understood by reference to the Detailed Description Section of the present invention in coordination with the Drawings.

SUMMARY OF THE INVENTION

It is therefore a purpose of the present invention to teach a coordinated continuous process that couples alcohol and base catalyst mediated esterifified triglyceride, (i.e. fatty acid ester), production, with co-production of glycerol ethers from by-products, said process utilizing renewable triglycerides and optionally, renewable alcohol, as source materials.

It is another purpose yet of the present invention to teach a coordinated process that couples alcohol and base mediated esterified triglyceride production, with co-production of glycerol ethers from by-products, utilizing renewable triglycerides as a source, wherein said process preferably utilizes methanol alcohol.

It is another purpose of the present invention to teach a coordinated single process that couples alcohol and base mediated esterified triglyceride production, with co-production of glycerol ethers from by-products, utilizing renewable triglycerides as a source, to produce Biodiesel fuel having a Cloud-point below thirty-two (32) degrees Fahrenheit.

It is yet another purpose of the present invention to teach a Biodiesel fuel having a Cloud-point below thirty-two (32) degrees Fahrenheit, produced from a coordinated single process that produces Biodiesel fuel including co-produced glycerol ethers utilizing renewable triglycerides as a source.

It is still yet another purpose of the present invention to teach a Biodiesel fuel with a Cloud-point below thirty-two (32) degrees Fahrenheit which is suitable for mixing with Carbon based Diesel fuel.

It is yet still another purpose of the present invention to teach a coordinated single process that provides a volume of esterified triglycerides in mixture with co-produced glycerol ethers, from an essentially equal volume of source triglycerides.

It is another purpose yet of the present invention to teach deionization of transesterified triglycerides, in the production of present invention Biodiesel fuel.

It is another purpose yet of the present invention to teach deionization of crude glycerol, in the production of present invention Biodiesel fuel.

It is yet another purpose yet of the present invention to teach a basic system for practicing the method thereof, and identify variations thereof, said systems being constructed from functional interconnection of elements such as:

a transesterification unit;

a transesterified triglycerides/crude glycerol separator unit;

deionization units;

a flash unit for separating glycerol and alcohol;

a reaction unit for etherifying crude glycerol;

a second flash unit for separating glycerol etherifying agent and etherified glycerol;

an extraction unit;

a distillation unit;

"xTBE" separation units, (e.g. "MTBE" "ETBE" etc);

functional interconnections;

It is still yet another purpose yet of the present invention to teach triglyceride transesterification heat exchange/reactor unit with feed tube(s) having, in the internal volume thereof, a static mixer which remains statically in place as a quantity of triglycerides and base and methyl alcohol is, during use, caused to flow through said internal volume thereof, to the end that said quantity of triglycerides and base and alcohol are continuously mixed together by interaction therewith.

BRIEF DESCRIPTION OF THE DRAWINGS

FIG. 1b demonstrates, in flow diagram form, a variation on the system for practicing the procedure of the present invention as shown in FIG. 1a.

FIG. 1c demonstrates, in flow diagram form, a variation on the system for practicing the procedure of the present invention as shown in FIG. 1a.

DETAILED DESCRIPTION

Figure 1A:
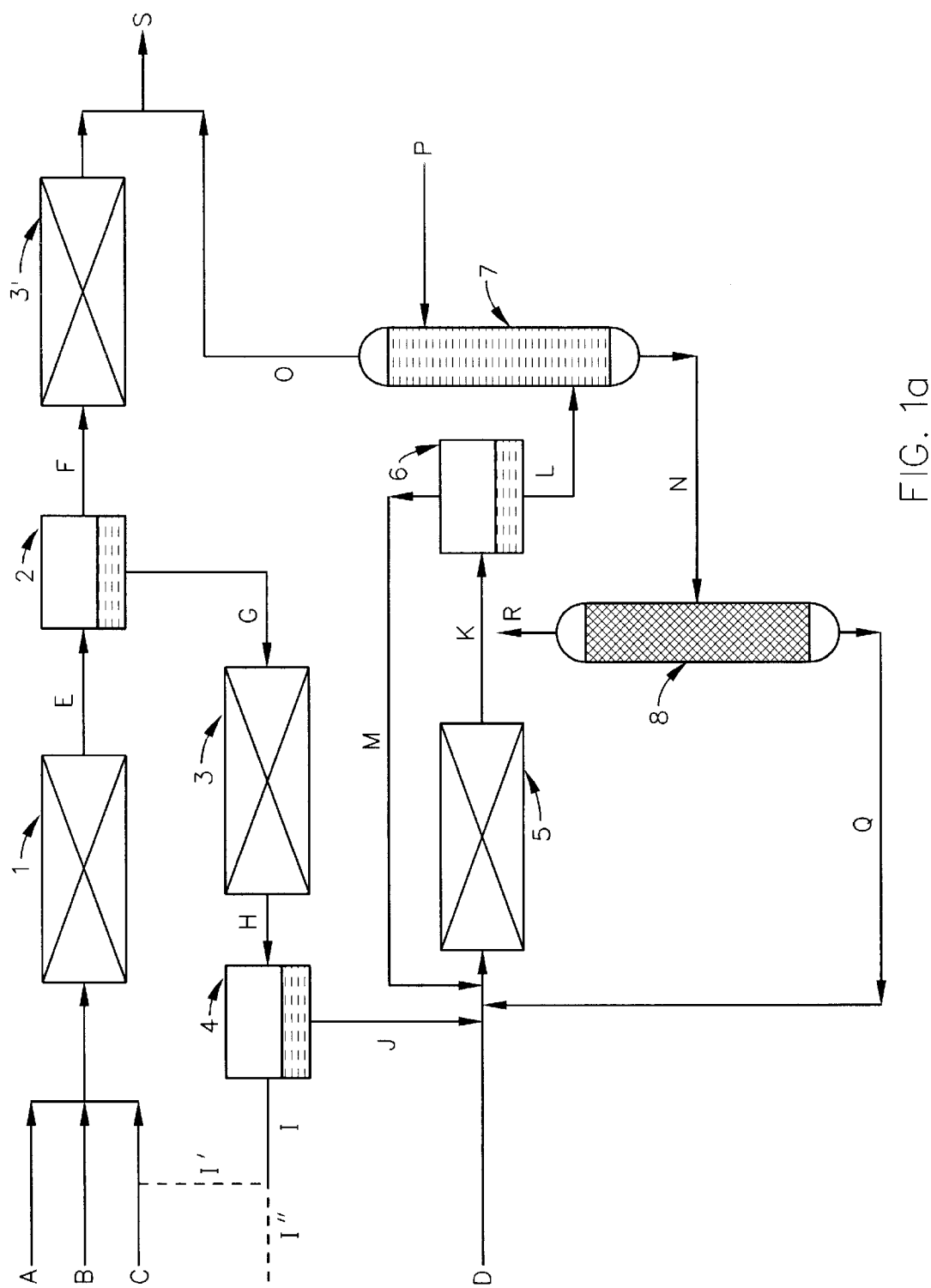
FIG. 1a demonstrates a system, in flow diagram form, for practicing the procedure of the present invention.

Referring now to FIG. 1a, there is shown an embodiment of a system for practicing the process of the present invention, wherein triglycerides, methanol, suitable base and isobutylene raw materials are continuously reacted to produce present invention Biodiesel fuel, which is defined as consisting of a mixture of transesterified triglycerides and etherified glycerol. (Note, FIG. 1a utilizes number designators, (1, 2, 3 . . . etc.) to identify system elements and letter designators (A,B,C . . . etc.) to identify process flow stream paths, (i.e. functional interconnections), between system elements).

Figure 1B:
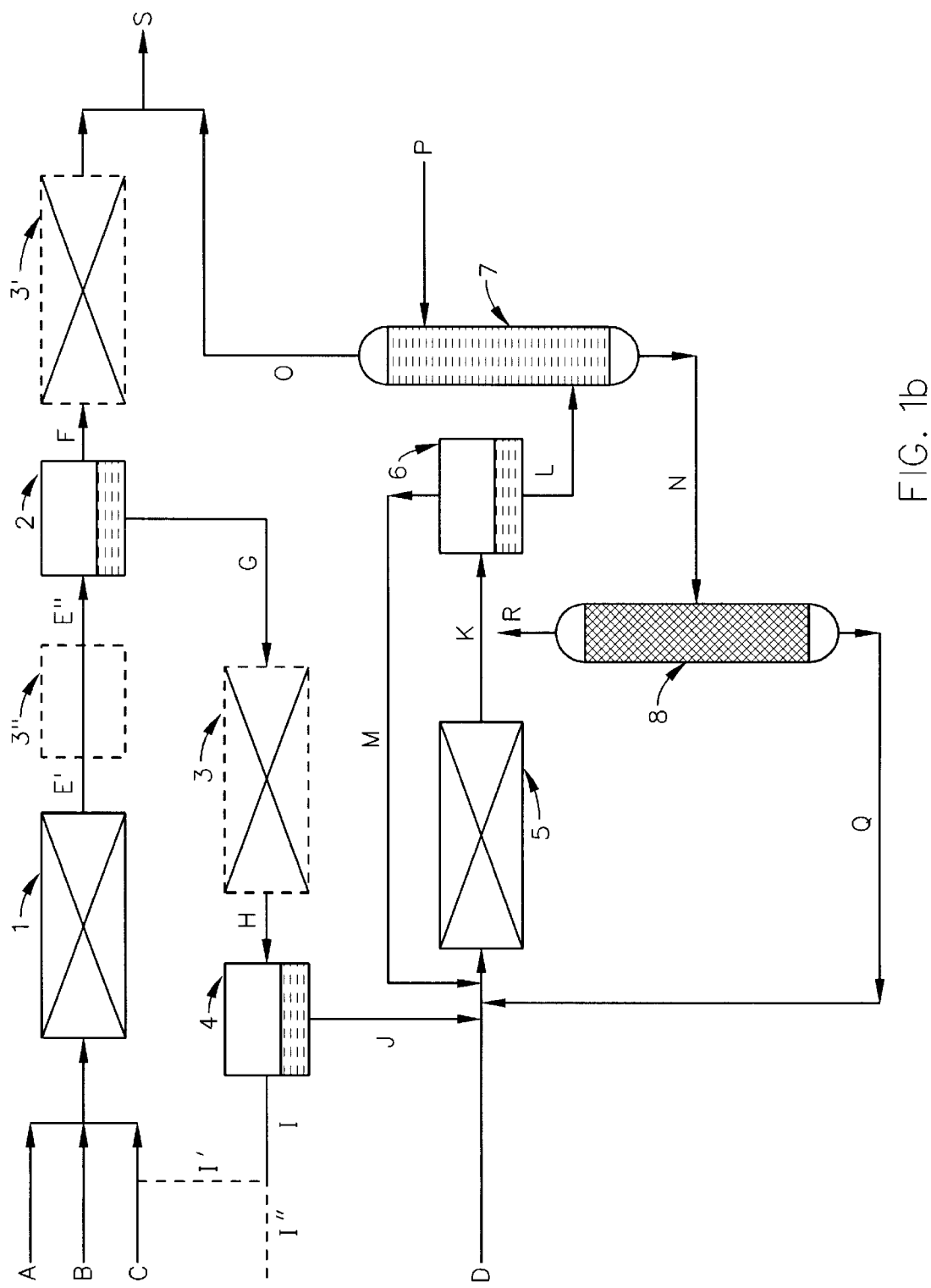

FIG. 1a shows that Triglyceride (A), Base (NaOH, KOH etc.) (B) and Methanol (C) streams are fed to the Transesterification unit (1). (Note, in the following Methanol Alcohol will be utilized as an example, however, it is emphasized that the present invention can be practiced in the utilizing Ethanol, Propanol or any Carbon Chain length Alcohol). A recycled methanol stream (I) and (I'), the source of which will become clear supra herein, is simultaneously shown as being fed to Methanol Stream (C). While not preferred, it is possible to simply discard, via flow path (I"), the Methanol rather than recycle it and remain within the scope of the present invention. Continuing, the feed into Reactors (1) typically comprises 0.1 to 1.0 wt % base, (based on the Triglycreide content), and a mole ratio of methanol to triglyceride of between 3–10 to 1. (It is noted that the Transesterification unit (1) can consist of one or more heated continuously stirred tank reactor(s) (CSTR), or one or more tubular reactor(s) with static mixers). Temperatures between 70 and 80 degrees centigrade and pressures from 1 to 2 atmospheres are utilized in said Transesterification unit (1), as necessary, to maintain the liquid product in the liquid phase, said product being a mixture flow stream containing glycerol, methyl esters and methanol (E). The flow stream (E) is fed into separator unit (2), formation of an upper non-polar phase comprising approximately 80 vol %, and a lower phase comprising approximately 20 vol %, occurs. (Note that said flow stream (E) can be caused to include a deionization unit (3") as shown in FIG. 1b, and then is demonstrated as a bifrucated flow path ((E) (E')).

Flow path (F), which carries primarily transesterified methyl esters, is shown to flow from the upper portion of Separator unit (2), where it combines with stream (O) (discussed supra herein), to become output the present invention Biodiesel fuel product stream path (S). (Note that said flow stream path (F) can be caused to pass through a deionization unit (3')). A flow stream (G), (consisting of glycerol and approximately 10–15 wt % residual methyl esters, methanol and base), is shown to flow from the lower portion of Separator unit (2). (Note, Separation unit (2) can consist of a continuous decanter or a centrifuge/clarifier.

All or part of the glycerol stream (G) typically proceeds to Deionization unit (3) where anions (Na+, K+ etc.) are removed and neutralized, with the results being formed into flow stream (H), but it is noted that it is within the scope of the present invention to delete said Deionization unit (3). (Note Deionization units (3) & (3') & (3") when present, can each consist of either a continuous ion exchange system, such as for practicing Higgins, Ashai, Fluicon etc. processes, or can consist of two or more resin beds, one or more of which are "on-line" while others are "off-line" for regeneration. Ion exchange material can be any of a number of available strongly acidic hydrogen form macromolecule cationic exchange resins, (e.g. Amberlyst-15, Dowex-50 etc.)).

Figure 1C:
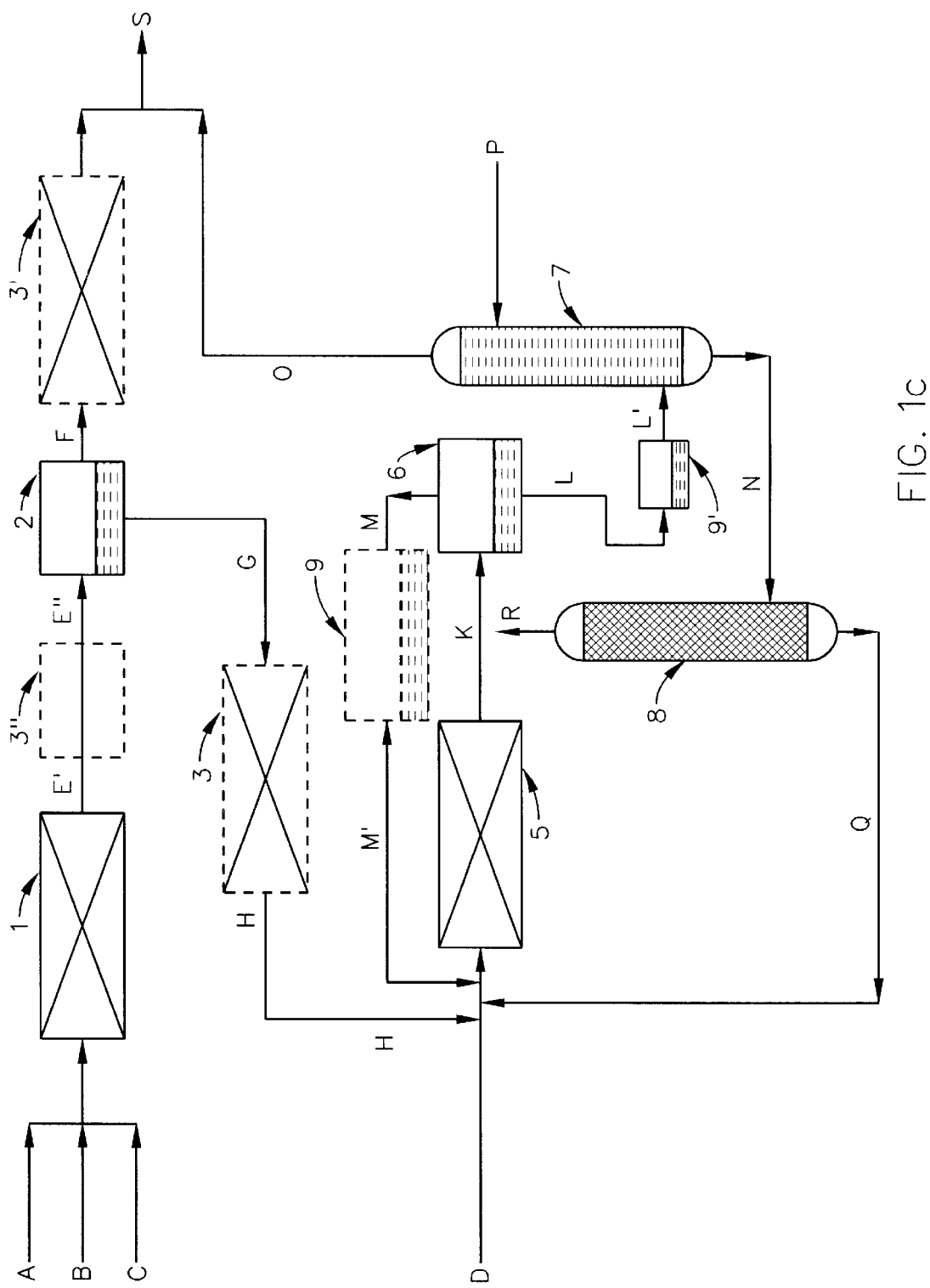

Continuing, flow stream (H) is shown as fed to Flash Unit (4) for separating glycerol and alcohol, wherein methanol is removed by vaporization and is, preferably, recycled as said flow streams (I) and (I'). (Note that flow stream (I") is indicated in dashed line form to suggest that it is within the scope of the present invention to, at least partially, expel said methanol rather than practice the preferred recycling thereof). Flow stream (J), which originates in the lower portion of Flash Unit (4) for separating glycerol and alcohol, consists of crude glycerol and residual methyl esters, (in a neutralized state where deionization unit (3) is present). It is also noted that flow stream path (J) might contain some residual methanol. (It is noted that it is within the scope of the present invention to entirely delete Flash Unit (4) for separating glycerol and alcohol, so that methanol does appear as input to Reaction unit for etherifying crude glycerol (5). FIG. 1c shows the optional presence of a first "xTBE" separation unit (9) and the optional presence of a second "xTBE" separation unit (9') which can become necessary to remove products, (e.g. (ETBE) (MTBE) and generally "xTBE"), which form in Reaction unit (5) when alcohol is present therein during an etherification of glycerol process). Further, it is to be understood that the system components ((6), (9) and (9')) can functionally be a single unit. Also, said second "xTBE" separation unit (9') might be utilized to remove any contaminate which appears in Flow Stream (L) and should not be considered as limited in use to removing only "xTBE" content.

Flow stream path (J) is shown as combined with flow path streams (M), (Q), and (D), which flow streams (M), (Q), and (D) are described directly. Flow stream path (D) preferably consists of raw feed isobutylene, flow stream path (M) consists of recycled isobutylene, and flow stream path (Q) consists of recycled glycerol and monoethers of glycerol. In reaction unit (5) glycerol and isobutylene are reacted in a liquid phase reaction in the presence of an acid catalyst. The isobutylene:glycerol mole ratio being minimally approximately 1.0 and ranging to above 3.0 to favor production of higher ethers, (i.e. di and tri-ethers). Reaction unit (5) can consist of one or more continuously stirred tank reactor(s) (CSTR's) in series, a reactive distillation reactor, fixed bed or plug flow reactors. In addition, Reaction unit (5) can be operated with continuous catalyst regeneration or in conjunction with sibling reactors in regeneration cycles. Multiple reactors can also be operated in series with appropriate phase separation and/or flash recycles.

The flow stream path (K) exiting Reaction unit (5) consists of a mixture of glycerol ethers, (mono-tertiary butyl ether, di-tertiary butyl ether, tri-tertiary butyl ether), glycerol and residual methyl ester and isobutylene. In addition there may be co-products which result from reactions, such as methyl tertiary butyl ether, (from reaction between methanol and isobutylene), 2,2,4 trimethyl 1-pentene and 2,2,4 trimethyl 2-pentene (from dimerization of isobutylene). Occurrence of co-products can be minimized by careful selection of reaction conditions and catalyst, however.

Flow stream path (K) is shown as fed to Flash unit (6) where excess isobutylene is removed for recycling via flow stream (M). Flow stream path (L) then consists of a mixture of mono-, di- and tri-ethers of glycerol and residual methyl ester and glycerol.

Flow stream path (L) is shown to be fed to Extraction unit (7), into which water is entered as flow stream (P). Flow path stream (N) is shown to exit Extraction unit (7) and consists of water, mono-ether, and glycerol. Flow stream path (O) also is shown to exit Extraction unit (7) and consists of di- and tri-ethers. Flow stream path (O) is shown as being combined with flow stream path (F) to form the final Product stream (S) which comprises present invention glycerol-ether containing, low Cloud-point, low viscosity methyl ester Biodiesel fuel.

Flow stream path (N) is shown as fed to Distillation unit (8) where water is removed via flow stream path (R). Flow stream path (Q) is shown exit Distillation unit (8) and serves to recycle mono-ethers and residual glycerol.

An alternative description based upon FIG. 1a, provides that the shown system be viewed as a system for practicing the process of producing an oxygenated biodiesel fuel with a cloud-point below 32 degrees Fahrenheit, said oxygenated biodiesel fuel consisting of a mixture of transesterified triglycerides and a cloud-point reducing amount of etherified glycerol, said process comprising the steps of:

a. providing a quantity of triglycerides;

b. transesterifying at least a portion of said triglycerides to produce a mixture of transesterified triglycerides and crude glycerol;

c. separating out, in an essentially pure state, most of said transesterified triglycerides from said mixture of transesterified triglycerides and crude glycerol, thereby also providing separated-out substantially crude glycerol;

d. optionally diverting a portion of said separated-out substantially crude glycerol;

e. etherifying remaining crude glycerol provided by steps c. and optionally d.; and f. remixing at least a portion of the resulting glycerol ethers produced in step e., with at least a portion of the step c. separated-out, essentially pure state transesterified triglycerides;

said steps a.–f. serving to produce said oxygenated biodiesel fuel with a cloud-point below 32 degrees Fahrenheit, without the required addition of other cloud-point reducing additive(s) and/or glycerol ethers from a source other than that identified in step e.

In said light said system in FIG. 1a is beneficially viewed as being comprised of, in functional combination, elements selected from the group consisting of:

a transesterification unit (1);

a transesterified triglycerides/crude glycerol separator unit (2);

a first deionization unit (3");

an upper non-polar phase deionization unit (3');

a lower phase deionization unit (3);

a first flash unit for separating glycerol and alcohol (4);

a reaction unit for etherifying crude glycerol (5);

a second flash unit for separating glycerol etherifying agent and etherified glycerol (6);

an extraction unit (7);

a distillation unit (8);

a first "xTBE" separation unit (9);

a second "xTBE" separation unit (9'); and functional interconnections;

Said transesterification unit (1) is shown as having functional input access (A) (B) (C) for entering alcohol and base catalyst and triglycerides thereinto during use. Said transesterification unit (1) has a functional output outlet which is functionally interconnected (E) to a functional inlet access of said transesterified triglycerides/crude glycerol separator unit (2), optionally through (E) (E') a first deionization unit (3"). During use, alcohol, base catalyst and triglycerides are entered to said transesterification unit (1) and transesterified triglycerides and crude glycerol which are produced in said transesterification unit (1) are caused to pass into said transesterified triglycerides/crude glycerol separator unit (2) through said functional interconnection (E) (E') therebetween. Said transesterified triglycerides/crude glycerol separator unit (2) has a functional output outlet for allowing flow of transesterified triglycerides into an output flow outlet (S) which is functionally interconnected (F) thereto, optionally through an upper non-polar phase deionization unit (3'), and said transesterified triglycerides/crude glycerol separator unit (2) has a functional output outlet for allowing flow of glycerol into a functional inlet access of said first flash unit (4) for separating crude glycerol and alcohol. Said functional inlet access of said first flash unit (4) for separating crude glycerol and alcohol is functionally interconnected (G) to said functional output outlet of said transesterified triglycerides/crude glycerol separator unit (2), said functional interconnection optionally being through (G) (H) a lower phase deionization unit (3). During use said transesterified triglycerides/crude glycerol separator unit (2) receives a mixture of transesterified triglycerides and crude glycerol from said transesterification unit (1), effects substantial separation of the transesterified triglycerides therefrom, and passes the substantially separated out transesterified triglycerides to output flow outlet (S) through functional interconnection (F), and passes the crude glycerol, along with remanent alcohol and transesterified triglycerides, to said first flash unit for separating crude glycerol and alcohol (4), through said functional interconnection (G). Said first flash unit for separating crude glycerol and alcohol (4) has a functional output outlet for allowing exit of said alcohol, and functional output outlet for allowing exit of crude glycerol. Said functional output outlet for allowing exit of said alcohol optionally is functionally interconnected (I) (I') to said transesterification unit (1) functional input access for entering alcohol thereinto such that recycling of alcohol can be achieved during use. Said first flash unit for separating crude glycerol (4) functional output outlet for allowing exit of crude glycerol is functionally interconnected (J) to a functional input access of reaction unit for etherifying crude glycerol (5), said reaction unit for etherifying crude glycerol (5) further has functional input access for allowing entry, during use, of a crude glycerol etherifying agent and a functional output outlet for exiting, during use, a mixture of etherified glycerol and remaining glycerol etherifying agent. Said reaction unit for etherifying crude glycerol (5) functional output outlet for exiting a mixture of etherified glycerol and remaining glycerol etherifying agent is functionally interconnected (K) to a functional input access of said second flash unit for separating glycerol etherifying agent and etherified glycerol (6), and said second flash unit for separating glycerol etherifying agent and etherified glycerol (6) further has a first functional output outlet and a second functional output outlet. Said first functional output outlet of said second flash unit for separating glycerol etherifying agent and etherified glycerol (6) is functionally interconnected (M) to the functional access for allowing entry of a crude glycerol etherifying agent into said reaction unit for etherifying crude glycerol (5), optionally through (M) (M') said first "xTBE" separation unit (9), such that recycling of said crude glycerol etherifying agent can be achieved in use. And said second functional output outlet of said second flash unit for separating glycerol etherifying agent and etherified glycerol (6) is functionally interconnected (L) to a functional input access of said extraction unit (7), optionally through (L) (L') said second "xTBE" separation unit (9'), said extraction unit (7) has a second functional input access (P) into which, during use, water is entered for the purpose of effecting substantial separation of di- and tri-ethers from a mixture of mono-, di- and tri-ethers of glycerol and residual methyl ester and glycerol, said extraction unit (7) has a first functional output outlet from which, during use, di- and tri-ethers are exited and caused to be merged with the transesterified triglycerides which exits separator unit (2). Said merger is via a functional interconnection (O) which provides functional merger from said extraction unit (7) first functional output outlet to output flow outlet (S). The result is that the present invention process provides at output flow outlet (S) during use:

said oxygenated biodiesel fuel with a cloud-point below 32 degrees Fahrenheit, said oxygenated biodiesel fuel consisting of a mixture of transesterified triglycerides and a cloud-point reducing amount of etherified glycerol.

It will be observed that said extraction unit (7) also has a second functional output outlet, for exiting therefrom a mixture of water, mono-, di- and tri-ethers of glycerol and residual methyl ester and glycerol from which has been substantially removed di- and tri-ethers, and residual methyl esters and entering, via a functional interconnection (N) thereto, said mixture of water, mono-, di- and tri-ethers of glycerol and residual methyl ester and glycerol from which has been substantially removed di- and tri-ethers and residual Methyl esters, into a functional input access of said distillation unit (8). Said distillation unit (8) further has first and second functional output outlets, such that during use, said distillation unit (8) serves to separate water from said mixture of water, mono-, di- and tri-ethers of glycerol and glycerol from which has been substantially removed di- and tri-ethers and residual Methyl Esters, and exits said water via said first functional output outlet thereof (R), while remaining mono-, di- and tri-ethers of glycerol and residual methyl ester and glycerol, from which has been substantially removed said water and di- and tri-ethers and residual Methyl esters, is exited via said second functional output outlet thereof and is then entered, via a functional interconnection (Q) thereto, into said reaction unit for etherifying crude glycerol (5) along with said crude glycerol etherifying agent.

FIG. 1b demonstrates, in flow diagram form, a variation on the system for practicing the procedure of the present invention as just described with respect to FIG. 1a. In particular note that a third Deionization unit, (i.e. (3")) is shown in addition to Deionization units (3) & (3'), and that all said Deionization units are shown as dashed lines. The dashed lines are to specifically demonstrate that none, any one, or any two, or all said Deionization units can be present in the present invention system, and be within the scope of the invention. In view of FIG. 1b, the present invention can be described as a system for practicing the process of producing an oxygenated biodiesel fuel with a cloud-point below 32 degrees Fahrenheit as recited infra herein with respect to FIG. 1. With respect to FIG. 1b, however, the system of the present invention relevant thereto which differs from that shown in FIG. 1a is comprised of, in functional combination, elements selected from the group consisting of:

a transesterification unit (1);

a transesterified triglycerides/crude glycerol separator unit (2);

optionally a first deionization unit (3");

optionally an upper non-polar phase deionization unit (3');

optionally a lower phase deionization unit (3);

a first flash unit for separating crude glycerol and alcohol (4);

a reaction unit for etherifying crude glycerol (5); and functional interconnections.

The system is otherwise described much as was FIG. 1a.

In particular note that FIG. 1b shows a Flow Path (I) and (I') present a functional interconnection between said functional access for allowing exit of alcohol from said first flash unit (4) for separating crude glycerol and alcohol, and said transesterification unit (1), which when included allow exiting alcohol of said first flash unit (4) for separating crude glycerol and alcohol, to be recycled as input to said transesterification unit (1).

Further, it is to be particularly noted that the FIG. 1b first deionization unit (3"), and the FIG. 1a and FIG. 1b shown upper non-polar phase deionization unit (3'), and said lower phase deionization unit (3) are shown in FIG. 1b as dashed lines. This is to indicate that none, or all thereof can be present with the resulting system remaining within the scope of the present invention. It is believed, however, that no prior art shows a deionization unit (3') positioned to de-ionize transesterified triglycerides in a system for producing an oxygenated biodiesel fuel consisting of a mixture of trans-esterified triglycerides and a cloud-point reducing amount of etherified glycerol, emphasis added.

FIG. 1c demonstrates, in flow diagram form, a variation on the system for practicing the procedure of the present invention as shown in FIG. 1a. In particular the Flash Unit (4), wherein in use, Methanol is usually removed by vaporization from glycerol and residual methyl esters, is removed. This allows Methanol to enter the reaction unit for etherifying crude glycerol (5) wherein glycerol and isobutylene are reacted in a liquid phase reaction in the presence of an acid catalyst, and the result is that (MTBE) is formed, ((ETBE) if Ethanol is the Alcohol utilized and other variations if other alcohols are used). FIG. 1c shows, in dashed lines, that one or two, "XTBE" Separators (9) and/or (9'), should be added, (e.g. in Flow stream paths (M) and/or (L)), when this is the case, to remove said produced (MTBE), or ((ETBE etc.)). Continuing, the same procedure recited with respect to discussion of FIG. 1a can be read into the disclosure again at this point, however, with respect to FIG. 1c, the system of the present invention, it must be noted that it is comprised of, in functional combination, elements selected from the group consisting of:

a transesterification unit (1);

a transesterified triglycerides/crude glycerol separator unit (2);

optionally a first deionization unit (3");

optionally an upper non-polar phase deionization unit (3');

optionally a lower phase deionization unit (3);

a reaction unit for etherifying crude glycerol (5);

a second flash unit for separating glycerol etherifying agent and etherified glycerol (6);

an extraction unit (7);

optionally a first "XTBE" separation unit (9);

optionally a second "xTBE" separation unit (9'); and functional interconnections.

In particular note that the first flash unit for separating crude glycerol and alcohol (4) is not present. Description of FIG. 1c then requires additional recitation. Referral to FIG. 1c shows said transesterification unit (1) has functional input access (A) (B) (C) for entering alcohol and base catalyst and triglycerides thereinto during use. Said transesterification unit (1) has a functional output outlet which is functionally interconnected (E) to a functional inlet access of said transesterified triglycerides/crude glycerol separator unit (2), optionally through (E) (E') a first deionization unit (3"). During use alcohol, base catalyst and triglycerides are entered to said transesterification unit (1) and transesterified triglycerides and crude glycerol which are produced in said transesterification unit (1) are caused to pass into said transesterified triglycerides/crude glycerol separator unit (2) through said functional interconnection (E) (E') therebetween. Said transesterified triglycerides/crude glycerol separator unit (2) has a functional output outlet for allowing flow of transesterified triglycerides into an output flow outlet (S) which is functionally interconnected (F) thereto, optionally through an upper non-polar phase deionization unit (3'). Said transesterified triglycerides/crude glycerol separator unit (2) has functional output outlet for allowing flow of glycerol directly into a functional inlet access of said reaction unit for etherifying crude glycerol (5) through functional interconnection (G).

Said functional interconnection optionally is through (G) (H) a lower phase deionization unit (3). During use said transesterified triglycerides/crude glycerol separator unit (2) receives a mixture of transesterified triglycerides and crude glycerol from said transesterification unit (1), effects substantial separation of the transesterified triglycerides therefrom, and passes the substantially separated out transesterified triglycerides to output flow outlet (S) through functional interconnection (F), and passes the crude glycerol, along with remanent alcohol and transesterified triglycerides, to said first flash unit for separating crude glycerol (4), through said functional interconnection (G). Said reaction unit for etherifying crude glycerol (5) further has functional input access for allowing entry, during use, of a crude glycerol etherifying agent and a functional output outlet for exiting, during use, a mixture of etherified glycerol and remaining glycerol etherifying agent. Said reaction unit for etherifying crude glycerol (5) functional output outlet for exiting a mixture of etherified glycerol and remaining glycerol etherifying agent is functionally interconnected (K) to a functional input access of said second flash unit for separating glycerol etherifying agent and etherified glycerol (6). Said second flash unit for separating glycerol etherifying agent and etherified glycerol (6) further has a first functional output outlet and a second functional output outlet, said first functional output outlet of said second flash unit for separating glycerol etherifying agent and etherified glycerol (6) being functionally interconnected (M) to the functional access for allowing entry of a crude glycerol etherifying agent into said reaction unit for etherifying crude glycerol (5), optionally through (M) (M') said first "xTBE" separation unit (9), such that recycling of said crude glycerol etherifying agent can be achieved in use. And said second functional output outlet of said second flash unit or separating glycerol etherifying agent and etherified glycerol (6) is functionally interconnected (L) to a functional input access of said extraction unit (7), optionally through (L) (L') said second "xTBE" separation unit (9'), said extraction unit (7). It is to be understood that where the first flash unit for separating crude glycerol and alcohol (4) is not included in a present invention system, at least one of the optionally present first "XTBE" separation unit (9) and second "xTBE" separation unit (9') must be present to remove the significant amount of "xTBE" which develops during etherification of glycerol in which is present alcohol, because said alcohol was not removed by application of the first flash unit for separating crude glycerol and alcohol (4). The recitation with respect to FIG. 1a infra herein, is hereafter applicable to FIG. 1c.

It is to be specifically noted that said first deionization unit (3"), said upper non-polar phase deionization unit (3'), and said lower phase deionization unit (3) are shown as dashed lines. This is to indicate that none, or all can be present. A similar case exists with respect to said first "xTBE" separation unit (9) and said second "XTBE" separation unit (9'). Either or both can be present, but again, at least one must be present where the a first flash unit for separating crude glycerol and alcohol (4) is deleted from the system, as is shown in FIG. 1c. Again, this is because allowing alcohol to enter the reaction unit for etherifying crude glycerol (5) causes formation "xTBE", (e.g. "MTBE", where Methanol is the alcohol utilized, or (ETBE), where Ethanol is the alcohol utilized), which must be removed prior to providing the etherified glycerol to the extraction unit (7) to achieve beneficial results.

FIGS. 1a, 1b and 1c demonstrate specific variations on the basic system of the present invention, but are to be viewed as non-limiting examples. Any system which can practice the method of the present invention should be considered as being within the scope of the present invention.

EXAMPLE

As a practical example of the present invention process, it is to be understood that approximately 137.5 lbs/hr of soy oil, 40 lbs/hr of methanol and 0.1775 lbs/hr of sodium hydroxide can be entered to continuously stirred tank Reaction unit (1) which is operated at 20 psig and approximately 80 degrees centigrade. Said conditions providing essentially 100% conversion of entered triglycerides to fatty acids and methyl esters. Phase separation in Separator unit (2) provides methyl esters in an upper location, and a mixture of glycerol and approximately 10–15 wt % residual methyl esters, methanol and base at a lower location. Approximately 14 lbs/hr of glycerol phase is then neutralized, present methanol flashed off, and the results sent to a continuously stirred Reaction unit (5) which is operated at 80 degrees centigrade and 320 psig. Said Reaction unit (5) also has present therein approximately 4 wt % Amberlyst-15 catalyst with a residence time of 2 hrs. Approximately 17.5 lbs/hr isobutylene is also fed to Reaction unit (5). Said conditions provide for the following approximate flow stream (K) composition, in (wt %):

| TRI-ETHER | DI-ETHER | MONO-ETHER | GLYCEROL | ISO-BUTYLENE | METHYL ESTERS |
|---|---|---|---|---|---|
| 9% | 47% | 21% | 5% | 14% | 4% |

The flow stream path (K) is then caused to pass through Flash unit (6) and Extraction unit (7) such that diethers, triethers, methyl esters and trace monoethers are formed into flow stream (O) and added "back" to the bulk methyl esters present in flow stream path (F) to provide the present invention Biodiesel fuel. The final product Biodiesel fuel is produced at approximately 145 lbs/hr and consists of approximately, (in wt %):

| ETHERS | METHYL ESTERS |
|---|---|
| 12% | 88% |

Said produced Biodiesel has a kinematic viscosity of 5.94 cSt at 70 degrees Fahrenheit and a Cloud-point of 23 degrees Fahrenheit, which is a greater than 0.5 cSt reduction in viscosity and 9 degree Cloud-point depression compared to Biodiesel without glycerol ethers present.

Briefly, a preferred version of the present invention process then comprises providing Triglycerides which are reacted in a liquid phase reaction with methanol and a homogeneous basic catalyst, said reaction yielding a spatially separated two phase result with an upper located non-polar phase consisting principally of transesterified triglycerides and a lower located phase consisting principally of crude glycerol and residual transesterified triglycerides. One or both of said phases is/are then passed through a strong cationic ion exchanger to remove anions, resulting in neutral product(s). The crude glycerol is then flashed to remove methanol and reacted with isobutylene in the presence of a strong acid catalyst to produce glycerol ethers. The glycerol ethers are then added back to the methyl ester phase to provide an improved present invention Biodiesel fuel.

Figures 2A, 2B, 2C:
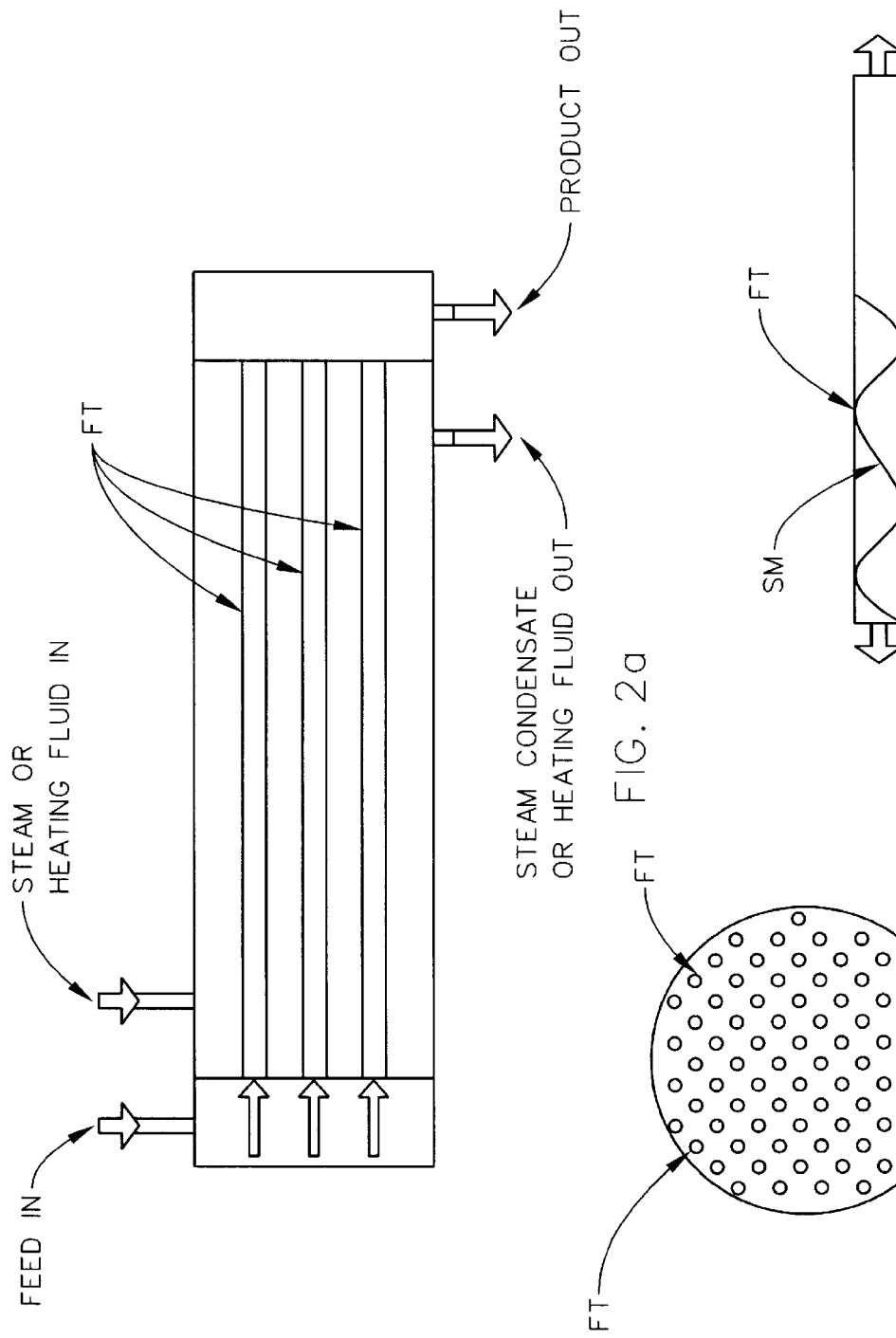
FIGS. 2a–2c demonstrate a preferred heat exchanger/reactor unit in which transesterification is cause to occur.

Turning now to FIGS. 2a–2c there is shown details of a specific Heat Exchange/Reactor unit. As mentioned infra herein, the Transesterification unit (1) can consist of one or more, (up to hundreds or even thousands), heated tube(s), each optionally containing a static mixer (SM) configured as shown in FIGS. 2a–2c. FIG. 2a shows a side cross-sectional view indicating the presence of Feed Tubes (FT), and Feed-In means for entering Triglyceride (A), Base (NaOH, KOH etc.) (B) and Methanol (C) streams thereto. Also indicated are Steam/Heating-Fluid entering means, and Steam/Heating Fluid-Out and Product-Out means. FIG. 2b shows an elevational end-on view, and FIG. 2c shows a detail of a single Feed Tube (FT) within which is present a Static Mixer (SM). In use triglycerides are caused to enter the Feed Tubes (FT) at said Feed-In means, and steam or heating fluid is caused to flow over the Feed-Tubes, to the end that the temperature of the triglycerides in the Feed Tubes (FT) is controlled as said triglycerides travels through said Feed-Tubes and exits at the Product-Out means. Said steam or heating fluid exits via the Steam/Heating Fluid-Out means.

While methanol was used as a primary example of a triglyceride esterifying agent in some of the foregoing examples, it is to be understood that any esterifying agent, (e.g. renewable ethanol), can also be utilized. And, it is similarly noted that crude glycerol etherifying agents other than isobutylene, (e.g. isoamylene), can also be utilized without escaping the scope of the present invention.

Further, it should be generally appreciated that the terminology "functional interconnection" typically indicates piping which can carry an identified liquid.

Also, while the terminology "consisting of" is utilized in the Claims as regards description of the composition of the Biodiesel fuel produced by practice of the present invention, (e.g. a mixture of transesterified triglycerides and etherified glycerol), such usage should not be interpreted to mean that other non-biodiesel fuel components can not be present with said mixture. In fact practice of the present invention process assures that the end result will have some accompanying alcohol, isobutylene or isoamalene etc. present therewith. This does not change the fact, however, that the produced Biodiesel fuel is defined as consisting of a mixture of transesterified triglycerides and etherified glycerol with a cloud-point below 32 degrees Fahrenheit, said result being achieved without the required addition of other cloud-point reducing additive(s) and/or glycerol ethers from a source other than which results from the transesterification of triglycerides. It is noted that no known prior art describes the presence of such a static mixer in a system for, nor the use of such in a procedure for, transesterifying triglycerides, emphasis added.

Finally, it is to be appreciated that the methodology of the present invention can be carried out in Batch or Continuous modes or by combinations therof, all of which are within the scope of the present invention.

Having hereby disclosed the subject matter of the present invention, it should be apparent that many modifications, substitutions, and variations of the present invention are possible in light thereof. It is to be understood that the present invention can be practiced other than as specifically described and should be limited in scope and breadth only by the appended Claims.

I claim:

1. A system for practicing a process of producing an oxygenated biodiesel fuel with a cloud-point below 32 degrees Fahrenheit, said oxygenated biodiesel fuel consisting of a mixture of transesterified triglycerides and a cloud-point reducing amount of etherified glycerol;

said system comprising:
a transesterification unit (1);
a transesterified triglycerides/crude glycerol separator unit (2);
optionally a first deionization unit (3");
optionally an upper non-polar phase deionization unit (3');
optionally a lower phase deionization unit (3);
a first flash unit for separating crude glycerol and alcohol (4);
a reaction unit for etherifying crude glycerol (5); and functional interconnections;

said transesterification unit (1) having functional input access (A) (B) (C) for entering alcohol and base catalyst and triglycerides thereinto during use;

said transesterification unit (1) having a functional output outlet which is functionally interconnected (E) to a functional inlet access of said transesterified triglycerides/crude glycerol separator unit (2), optionally through (E) (E') a first deionization unit (3"), such that during use alcohol, base catalyst and triglycerides are entered to said transesterification unit (1) and transesterified triglycerides and crude glycerol which are produced in said transesterification unit (1) are caused to pass into said transesterified triglycerides/crude glycerol separator unit (2) through said functional interconnection (E) (E') therebetween;

said transesterified triglycerides/crude glycerol separator unit (2) having a functional output outlet for allowing flow of transesterified triglycerides into an output flow outlet (S) which is functionally interconnected (F) thereto, optionally through an upper non-polar phase deionization unit (3'), and said transesterified triglycerides/crude glycerol separator unit (2) having functional output outlet for allowing flow of glycerol into a functional inlet access of said first flash unit for separating crude glycerol and alcohol (4), which functional inlet access of said first flash unit for separating crude glycerol and alcohol (4) is functionally interconnected (G) to said functional output outlet of said transesterified triglycerides/crude glycerol separator unit (2), said functional interconnection optionally being through (G) (H) a lower phase deionization unit (3), such that during use said transesterified triglycerides/crude glycerol separator unit (2) receives a mixture of transesterified triglycerides and crude glycerol from said transesterification unit (1), effects substantial separation of the transesterified triglycerides therefrom, and passes the substantially separated out transesterified triglycerides to output flow outlet (S) through functional interconnection (F), and passes the crude glycerol, along with remanent alcohol and transesterified triglycerides, to said first flash unit for separating crude glycerol and alcohol (4), through said functional interconnection (G);

said first flash unit for separating crude glycerol and alcohol (4) having a functional output outlet for allowing exit of said alcohol, and functional output outlet for allowing exit of crude glycerol, said functional output outlet for allowing exit of said alcohol optionally being functionally interconnected (I) (I') to said transesterification unit (1) functional input access for entering alcohol thereinto such that recycling of alcohol can be achieved during use, and said first flash unit for separating crude glycerol and alcohol (4) functional output outlet for allowing exit of crude glycerol being functionally interconnected (J) to a functional input access of reaction unit for etherifying crude glycerol (5), said reaction unit for etherifying crude glycerol (5) further having functional input access for allowing entry, during use, of a crude glycerol etherifying agent and a functional output outlet for exiting, during use, a mixture of etherified glycerol and remaining glycerol etherifying agent;

said system being adaptable to practice of a process comprising the steps of:
a. providing a quantity of triglycerides;
b. transesterifying at least a portion of said triglycerides to produce a mixture of transesterified triglycerides and crude glycerol;
c. separating out, in an essentially pure state, most of said transesterified triglycerides from said mixture of transesterified triglycerides and crude glycerol, thereby also providing separated-out substantially crude glycerol;
d. optionally diverting a portion of said separated-out substantially crude glycerol;
e. etherifying remaining crude glycerol provided by steps c. and optionally d.; and
f. remixing at least a portion of the resulting glycerol ethers produced in step e., with at least a portion of the step c. separated-out, essentially pure state transesterified triglycerides;

said steps a.–f. serving to produce said oxygenated biodiesel fuel with a cloud-point below 32 degrees Fahrenheit, without the required addition of other cloud-point reducing additive(s) and/or glycerol ethers from a source other than that identified in step e.

2. A system for practicing a process of producing an oxygenated biodiesel fuel with a cloud-point below 32 degrees Fahrenheit as in claim 1 which comprises a functional interconnection (I) (I') between said functional output outlet for allowing exit of alcohol from said first flash unit for separating crude glycerol and alcohol (4), and said transesterification unit (1), so that during use alcohol exiting said functional output outlet for allowing exit of alcohol of said first flash unit for separating crude glycerol and alcohol (4), is recycled as input to said transesterification unit (1).

3. A system for practicing a process of producing an oxygenated biodiesel fuel with a cloud-point below 32 degrees Fahrenheit as in claim 1 in which said first deionization unit (3") is present.

4. A system for practicing a process of producing an oxygenated biodiesel fuel with a cloud-point below 32 degrees Fahrenheit as in claim 1 in which said upper non-polar phase deionization unit (3') is present.

5. A system for practicing a process of producing an oxygenated biodiesel fuel with a cloud-point below 32 degrees Fahrenheit as in claim 1 in which said lower phase deionization unit (3) is present.

6. A system for practicing a process of producing an oxygenated biodiesel fuel with a cloud-point below 32 degrees Fahrenheit as in claim 1 in which are present at least two of the members of the group consisting of:
    said first deionization unit (3");
    said upper non-polar phase deionization unit (3'); and
    said lower phase deionization unit (3).

7. A system for practicing a process of producing an oxygenated biodiesel fuel with a cloud point below 32 degrees Fahrenheit as in claim 1 in which the transesterification unit is a selection from the group consisting of:
    one or more heated continuously stirred tank reactor(s) (CSTR), and one or more tubular reactor(s) with static mixers.

8. A system for practicing a process of producing an oxygenated biodiesel fuel with a cloud point below 32 degrees Fahrenheit as in claim 1, in which the transesterified triglycerides/crude glycerol separator unit (2) consists of a selection from the group consisting of:
    a continuous decanter and a centrifuge/clarifier.

9. A system for practicing a process of producing an oxygenated biodiesel fuel with a cloud point below 32 degrees Fahrenheit as in claim 1, in which each at least one of the upper non-polar phase deionization unit (3') and lower phase deionization unit (3) and first deionization unit (3") are present and consist(s) of a selection from the group consisting of:
    a continuous ion exchange system as used for practicing Higgins, Ashai, and Fluicon processes, and
    two or more resin beds, one or more of which are "on-line" while others are "off-line" for regeneration.

10. A system for practicing a process of producing an oxygenated biodiesel fuel with a cloud point below 32 degrees Fahrenheit as in claim 1, in which at least one of the upper non-polar phase deionization unit (3') and lower phase deionization unit (3) and first deionization unit (3") is present and contain(s) a strongly acidic hydrogen form macromolecule cationic exchange resins selected from the group consisting of:
    Amberlyst-15, and Dowex-50.

11. A system for practicing a process of producing an oxygenated biodiesel fuel with a cloud point below 32 degrees Fahrenheit as in claim 1, in which the reaction unit (5) consists of a selection from the group consisting of:
    one or more continuously stirred tank reactor(s), reactive distillation reactor(s), and
    fixed bed or plug flow reactor(s),
and in which said reaction unit is operated in a mode selected from the the group consisting of:
    continuous catalyst regeneration and in regeneration cycles.

12. A system for practicing a process of producing an oxygenated biodiesel fuel with a cloud point below 32 degrees Fahrenheit as in claim 1, in which the transesterification unit is a heat exchanger/reactor unit comprised of feed tube(s), each having interior volume surrounded by an outer surface, through which interior volume said quantity of triglycerides, base and methyl alcohol is caused to flow in use, which heat exchange/reactor further includes means for causing steam or heating fluid to flow around the outer surface of said feed tube(s) in use so as to control the temperature of said triglycerides, base and methyl alcohol during passage through said feed tube(s) to the end that transesterification of at least some of said present triglycerides is achieved.

13. A system for practicing a process of producing an oxygenated biodiesel fuel with a cloud-point below 32 degrees Fahrenheit as in claim 1,
    said system transesterification unit heat comprising a exchanger/reactor comprised of at least one feed tube(s) which have an internal volume and outer surface, through which internal volume of said at least one feed tube(s) a quantity of triglycerides and base catalyst and alcohol is caused to flow in use, said heat exchange/reactor further including means for causing steam or heating fluid to flow around the outer surface of said at least one feed tube(s) in use so as to control the temperature of said triglycerides and base catalyst and alcohol during passage through the internal volume of said at least one feed tube(s) to the end that transesterification of at least some of said triglycerides is achieved, at least one of said heat exchange/reactor unit at least one feed tube(s) having, in said internal volume thereof, a static mixer which remains statically in place as a quantity of triglycerides and base catalyst and methyl alcohol is caused to flow through said internal volume thereof, in use, to the end that said quantity of triglycerides and base catalyst and alcohol are mixed together by interaction therewith.

14. A system for practicing a process of producing an oxygenated biodiesel fuel with a cloud point below 32 degrees Fahrenheit as in claim 13, in which said transesterification unit heat exchanger/reactor all of said at least one feed tube(s) contain a
    static mixer in said internal volume thereof, which static mixer remains statically in place as a quantity of triglycerides and
    base catalyst and methyl alcohol is caused to flow through said internal volume thereof.

15. A system for practicing a process of producing an oxygenated biodiesel fuel with a cloud-point below 32 degrees Fahrenheit, said oxygenated biodiesel fuel consisting of a mixture of transesterified triglycerides and a cloud-point reducing amount of etherified glycerol
    said system comprising:
        a transesterification unit (1);
        a transesterified triglycerides/crude glycerol separator unit (2);
        optionally a first deionization unit (3");
        optionally an upper non-polar phase deionization unit (3');
        optionally a lower phase deionization unit (3);
        a reaction unit for etherifying crude glycerol (5);
        a second flash unit or separating glycerol etherifying agent and etherified glycerol (6);
        an extraction unit (7);

optionally a first "xTBE" separation unit (9);
optionally a second "xTBE" separation unit (9'); and
functional interconnections;

said transesterification unit (1) having functional input access (A) (B) (C) for entering alcohol and base catalyst and triglycerides thereinto during use;

said transesterification unit (1) having a functional output outlet which is functionally interconnected (E) to a functional inlet access of said transesterified triglycerides/crude glycerol separator unit (2), optionally through (E) (E') a first deionization unit (3"), such that during use alcohol, base catalyst and triglycerides are entered to said transesterification unit (1) and transesterified triglycerides and crude glycerol which are produced in said transesterification unit (1) are caused to pass into said transesterified triglycerides/crude glycerol separator unit (2) through said functional interconnection (E) (E') therebetween;

said transesterified triglycerides/crude glycerol separator unit (2) having a functional output outlet for allowing flow of transesterified triglycerides into an output flow outlet (S) which is functionally interconnected (F) thereto, optionally through an upper non-polar phase deionization unit (3'), and said transesterified triglycerides/crude glycerol separator unit (2) having functional output outlet for allowing flow of glycerol into a functional inlet access of reaction unit for etherifying crude glycerol (5), through functional interconnection (H), said reaction unit for etherifying crude glycerol (5) further having functional input access for allowing entry, during use, of a crude glycerol etherifying agent and a functional output outlet for exiting, during use, a mixture of etherified glycerol and remaining glycerol etherifying agent;

said reaction unit for etherifying crude glycerol (5) functional output outlet for exiting a mixture of etherified glycerol and remaining glycerol etherifying agent being functionally interconnected (K) to a functional input access of said second flash unit or separating glycerol etherifying agent and etherified glycerol (6);

said second flash unit or separating glycerol etherifying agent and etherified glycerol (6) further having a first functional output outlet and a second functional output outlet, said first functional output outlet of said second flash unit or separating glycerol etherifying agent and etherified glycerol (6) being functionally interconnected (M) to the functional access for allowing entry of a crude glycerol etherifying agent into said reaction unit for etherifying crude glycerol (5), optionally through (M) (M') said first "xTBE" separation unit (9), such that recycling of said crude glycerol etherifying agent can be achieved in use, and said second functional output outlet of said second flash unit or separating glycerol etherifying agent and etherified glycerol (6) being functionally interconnected (L) to a functional input access of said extraction unit (7), optionally through (L) (L') said second "xTBE" separation unit (9'), said extraction unit (7) having a second functional input access (P) into which, during use, water is entered for the purpose of effecting substantial separation of di- and tri-ethers and residual methyl esters from a mixture of mono-, di- and tri-ethers of glycerol and glycerol, said extraction unit (7) having a first functional output outlet from which, during use, di- and tri-ethers are exited and caused to be merged with the transesterified triglycerides which exits separator unit (2), said merger being via a functional interconnection (O) which provides functional merger from said extraction unit (7) first functional output outlet to output flow outlet (S);

thereby providing at output flow outlet (S) during use, said oxygenated biodiesel fuel with a cloud-point below 32 degrees Fahrenheit, said oxygenated biodiesel fuel consisting of a mixture of transesterified triglycerides and a cloud-point reducing amount of etherified glycerol;

at least one of said optionally present first "XTBE" separation unit (9) and optionally present second "xTBE" separation unit (9'), being actually present in said system for practicing a process of producing an oxygenated biodiesel fuel with a cloud-point below 32 degrees Fahrenheit;

said system being adaptable to practice of a process comprising the steps of:
a. providing a quantity of triglycerides;
b. transesterifying at least a portion of said triglycerides to produce a mixture of transesterified triglycerides and crude glycerol;
c. separating out, in an essentially pure state, most of said transesterified triglycerides from said mixture of transesterified triglycerides and crude glycerol, thereby also providing separated-out substantially crude glycerol;
d. optionally diverting a Portion of said separated-out substantially crude glycerol;
e. etherifying remaining crude glycerol provided by steps c. and optionally d.; and
f. remixing at least a portion of the resulting glycerol ethers produced in step e., with at least a portion of the step
c. separated-out, essentially pure state transesterified triglycerides;

said steps a.–f. serving to produce said oxygenated biodiesel fuel with a cloud-point below 32 degrees Fahrenheit, without the required addition of other cloud-point reducing additive(s) and/or glycerol ethers from a source other than that identified in step e.

16. A system for practicing a process of producing an oxygenated biodiesel fuel with a cloud-point below 32 degrees Fahrenheit as in claim 15 in which said first deionization unit (3") is present.

17. A system for practicing a process of producing an oxygenated biodiesel fuel with a cloud-point below 32 degrees Fahrenheit as in claim 15 in which said upper non-polar phase deionization unit (3') is present.

18. A system for practicing a process of producing an oxygenated biodiesel fuel with a cloud-point below 32 degrees Fahrenheit as in claim 15 in which said lower phase deionization unit (3) is present.

19. A system for practicing a process of producing an oxygenated biodiesel fuel with a cloud-point below 32 degrees Fahrenheit as in claim 15 in which are present at least two of the members of the group consisting of:
said first deionization unit (3");
said upper non-polar phase deionization unit (3'); and
said a lower phase deionization unit (3).

20. A system for practicing a process of producing an oxygenated biodiesel fuel with a cloud-point below 32 degrees Fahrenheit as in claim 15 in which is present said first "xTBE" separation unit (9).

21. A system for practicing a process of producing an oxygenated biodiesel fuel with a cloud-point below 32 degrees Fahrenheit as in claim 15 in which is present said second "xTBE" separation unit (9').

22. A system for practicing a process of producing an oxygenated biodiesel fuel with a cloud-point below 32 degrees Fahrenheit as in claim 15 in which are present both said first "xTBE" separation unit (9) and said second "XTBE" separation unit (9').

23. A system for practicing a process of producing an oxygenated biodiesel fuel with a cloud-point below 32 degrees Fahrenheit as in claim 19, said system transesterification unit comprising a heat exchanger/reactor comprised of at least one feed tube(s) which have an internal volume and outer surface, through which internal volume of said at least one feed tube(s) a quantity of triglycerides and base catalyst and alcohol is caused to flow in use, said heat exchange/reactor further including means for causing steam or heating fluid to flow around the outer surface of said at least one feed tube(s) in use so as to control the temperature of said triglycerides and base catalyst and alcohol during passage through the internal volume of said at least one feed tube(s) to the end that transesterification of at least some of said triglycerides is achieved, at least one of said heat exchange/reactor unit at least one feed tube(s) having, in said internal volume thereof, a static mixer which remains statically in place as a quantity of triglycerides and base catalyst and methyl alcohol is caused to flow through said internal volume thereof, in use, to the end that said quantity of triglycerides and base catalyst and alcohol are mixed together by interaction therewith.

24. A system for practicing a process of producing an oxygenated biodiesel fuel with a cloud point below 32 degrees Fahrenheit as in claim 23, in which said transesterification unit heat exchanger/reactor all of said at least one feed tube(s) contain a static mixer in said internal volume thereof, which static mixer remains statically in place as a quantity of triglycerides and base catalyst and methyl alcohol is caused to flow through said internal volume thereof.

25. A system for practicing a process of producing an oxygenated biodiesel fuel with a cloud-point below 32 degrees Fahrenheit, said oxygenated biodiesel fuel consisting of a mixture of transesterified triglycerides and a cloud-point reducing amount of etherified glycerol
said system comprising:
said transesterification unit (1) having functional input access (A) (B) (C) for entering alcohol and base catalyst and triglycerides thereinto during use;
said transesterification unit (1) having a functional output outlet which is functionally interconnected (E) to a functional inlet access of said transesterified triglycerides/crude glycerol separator unit (2), optionally through (E) (E') a first deionization unit (3"), such that during use alcohol, base catalyst and triglycerides are entered to said transesterification unit (1) and transesterified triglycerides and crude glycerol which are produced in said transesterification unit (1) are caused to pass into said transesterified triglycerides/crude glycerol separator unit (2) through said functional interconnection (E) (E') therebetween;
said transesterified triglycerides/crude glycerol separator unit (2) having a functional output outlet for allowing flow of transesterified triglycerides into an output flow outlet (S) which is functionally interconnected (F) thereto, optionally through an upper nonpolar phase deionization unit (3'), and said transesterified triglycerides/crude glycerol separator unit (2) having functional output outlet for allowing flow of glycerol into a functional inlet access of said first flash unit for separating crude glycerol and alcohol (4), which functional inlet access of said first flash unit for separating crude glycerol and alcohol (4) is functionally interconnected (G) to said functional output outlet of said transesterified triglycerides/crude glycerol separator unit (2), said functional interconnection optionally being through (G) (H) a lower phase deionization unit (3), such that during use said transesterified triglycerides/crude glycerol separator unit (2) receives a mixture of transesterified triglycerides and crude glycerol from said transesterification unit (1), effects substantial separation of the transesterified triglycerides therefrom, and passes the substantially separated out transesterified triglycerides to output flow outlet (S) via functional interconnection (F), and passes the crude glycerol, along with remanent alcohol and transesterified triglycerides, to said first flash unit for separating crude glycerol and alcohol (4), through said functional interconnection (G);

said first flash unit for separating crude glycerol and alcohol (4) having a functional output outlet for allowing exit of said alcohol, and functional output outlet for allowing exit of crude glycerol, said functional output outlet for allowing exit of said alcohol optionally being functionally interconnected (I) (I') to said transesterification unit (1) functional input access for entering alcohol thereinto such that recycling of alcohol can be achieved during use, and said first flash unit for separating crude glycerol and alcohol (4) functional output outlet for allowing exit of crude glycerol being functionally interconnected (J) to a functional input access of reaction unit for etherifying crude glycerol (5), said reaction unit for etherifying crude glycerol (5) further having functional input access for allowing entry, during use, of a crude glycerol etherifying agent, and a functional output outlet for exiting, during use, a mixture of etherified glycerol and remaining glycerol etherifying agent;

said reaction unit for etherifying crude glycerol (5) functional output outlet for exiting a mixture of etherified glycerol and remaining glycerol etherifying agent being functionally interconnected (K) to a functional input access of said second flash unit or separating glycerol etherifying agent and etherified glycerol (6); said second flash unit or separating glycerol etherifying agent and etherified glycerol (6) further having a first functional output outlet and a second functional output outlet, said first functional output outlet of said second flash unit for separating glycerol etherifying agent and etherified glycerol (6) being functionally interconnected (M) to the functional access for allowing entry of a crude glycerol etherifying agent into said reaction unit for etherifying crude glycerol (5), optionally through (M) (M') said first "xTBEI" separation unit (9), such that recycling of said crude glycerol etherifying agent can be achieved in use, and said second functional output outlet of said second flash unit or separating glycerol etherifying agent and etherified glycerol (6) being functionally interconnected (L) to a functional input access of said extraction unit (7), optionally through (L) (L') said second "xTBE" separation unit (9'), said extraction unit (7) having a second functional input access (P) into which, during use, water is entered for the purpose of effecting substantial separation of di- and tri-ethers and residual methyl esters from a mixture of mono-, di- and tri-ethers of glycerol and glycerol, said extraction unit (7) having a first functional output outlet from which, during use, di- and tri-ethers and residual methyl esters are exited and caused to be merged with the transesterified triglycerides which exits separator unit (2), said merger being via a functional interconnection (O) which provides functional merger from said extraction unit (7) first functional output outlet to output flow outlet (S);

thereby providing at output flow outlet (S) during use, said oxygenated biodiesel fuel with a cloud-point below 32 degrees Fahrenheit, said oxygenated biodiesel fuel consisting of a mixture of transesterified triglycerides and a cloud-point reducing amount of etherified glycerol;

said extraction unit (7) also having a second functional output outlet, for exiting therefrom a mixture of water, mono-, di- and tri-ethers of glycerol and residual methyl ester and glycerol from which has been substantially removed di- and tri-ethers, and entering, through a functional interconnection (N) thereto, said mixture of water, mono-, di- and tri-ethers of glycerol and residual methyl ester and glycerol from which has been substantially removed di- and tri-ethers and residual methyl esters, into a functional input access of said distillation unit (8), said distillation unit (8) further having first and second functional output outlets, such that during use, said distillation unit (8) serves to separate water from said mixture of water, mono-, di- and tri-ethers of glycerol and glycerol from which has been substantially removed di- and tri-ethers and residual methyl ester, and exits said water through said first functional output outlet thereof (R), while remaining mono-, di- and tri-ethers of glycerol and residual methyl ester and glycerol, from which has been substantially removed said water and di- and tri-ethers and residual methyl esters, is exited through said second functional output outlet thereof and is then entered, through a functional interconnection (Q) thereto, into said reaction unit for etherifying crude glycerol (5) along with said crude glycerol etherifying agent;

said system being adaptable to practice of a process comprising the steps of:
a. providing a quantity of triglycerides;
b. transesterifying at least a portion of said triglycerides to produce a mixture of transesterified triglycerides and crude glycerol;
c. separating out, in an essentially pure state, most of said transesterified triglycerides from said mixture of transesterified triglycerides and crude glycerol, thereby also providing separated-out substantially crude glycerol;
d. optionally diverting a portion of said separated-out substantially crude glycerol;
e. etherifying remaining crude glycerol provided by steps c. and optionally d.; and
f. remixing at least a portion of the resulting glycerol ethers produced in step e., with at least a portion of the step c. separated-out, essentially pure state transesterified triglycerides;

said steps a.–f. serving to produce said oxygenated biodiesel fuel with a cloud-point below 32 degrees Fahrenheit, without the required addition of other cloud-point reducing additive(s) and/or glycerol ethers from a source other than that identified in step e.

26. A system for practicing a process of producing an oxygenated biodiesel fuel with a cloud-point below 32 degrees Fahrenheit as in claim 25, said system transesterification unit comprising a heat exchanger/reactor comprised of at least one feed tube(s) which have an internal volume and outer surface, through which internal volume of said at least one feed tube(s) a quantity of triglycerides and base catalyst and alcohol is caused to flow in use, said heat exchange/reactor further including means for causing steam or heating fluid to flow around the outer surface of said at least one feed tube(s) in use so as to control the temperature of said triglycerides and base catalyst and alcohol during passage through the internal volume of said at least one feed tube(s) to the end that transesterification of at least some of said triglycerides is achieved, at least one of said heat exchange/reactor unit at least one feed tube(s) having, in said internal volume thereof, a static mixer which remains statically in place as a quantity of triglycerides and base catalyst and methyl alcohol is caused to flow through said internal volume thereof, in use, to the end that said quantity of triglycerides and base catalyst and alcohol are mixed together by interaction therewith.

27. A system for practicing a process of producing an oxygenated biodiesel fuel with a cloud point below 32 degrees Fahrenheit as in claim 26, in which said transesterification unit heat exchanger/reactor all of said at least one feed tube(s) contain a static mixer in said internal volume thereof, which static mixer remains statically in place as a quantity of triglycerides and base catalyst and methyl alcohol is caused to flow through said internal volume thereof.

* * * * *